United States Patent [19]
Shimizu et al.

[11] 3,832,610
[45] Aug. 27, 1974

[54] PULSE OPERATED SURFACE MOTOR

[75] Inventors: Kanryo Shimizu; Hiromichi Shichida; Kenichi Toyoda, all of Tokyo, Japan

[73] Assignees: Fujitsu Limited; Fujitsu Fanuc Limited, both of Tokyo, Japan

[22] Filed: Aug. 31, 1973

[21] Appl. No.: 393,465

[30] Foreign Application Priority Data
Sept. 8, 1972 Japan................................ 47-90079
Sept. 8, 1972 Japan................................ 47-90080

[52] U.S. Cl...................... 318/135, 318/8, 318/38, 310/13
[51] Int. Cl. .......................................... H02k 41/02
[58] Field of Search ............ 310/12, 13, 14, 15, 17, 310/27; 318/8, 37, 7 S, 38, 135, 687; 346/29

[56] References Cited
UNITED STATES PATENTS
3,268,747 8/1966 Snowdon ............................ 310/13
3,656,014 4/1972 Rich..................................... 310/13
3,771,035 11/1973 Cless..................................... 318/13 S
R27,289 2/1972 Sawyer ......................... 318/13 S X
R27,436 7/1972 Sawyer ......................... 318/13 S X Primary Examiner—Gerald Goldberg
Attorney, Agent, or Firm—Maleson, Kimmelman & Ratner

[57] ABSTRACT

A pulse operated electromagnetic drive system along a plane is referred to, as a pulse operated surface motor in the present disclosure. The pulse operated motor is comprised of a plane-like stator, a first movable body which is restrained to move only in a first direction on the stator, a second movable body located on the first movable body which is restrained to individually move only in a second direction on the stator but which moves together with the first movable body in the first direction perpendicular to the second direction and sliders which are fixed to said first or second movable body, cooperate electromagnetically with said plane-like stator.

3 Claims, 22 Drawing Figures

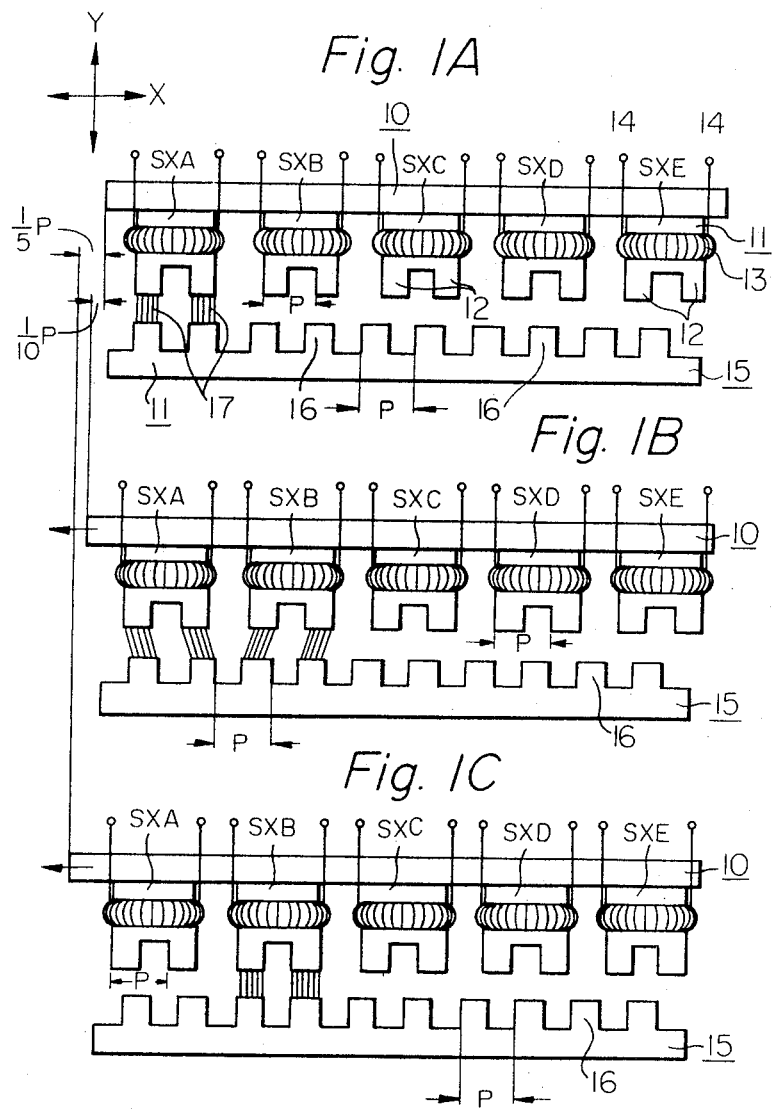

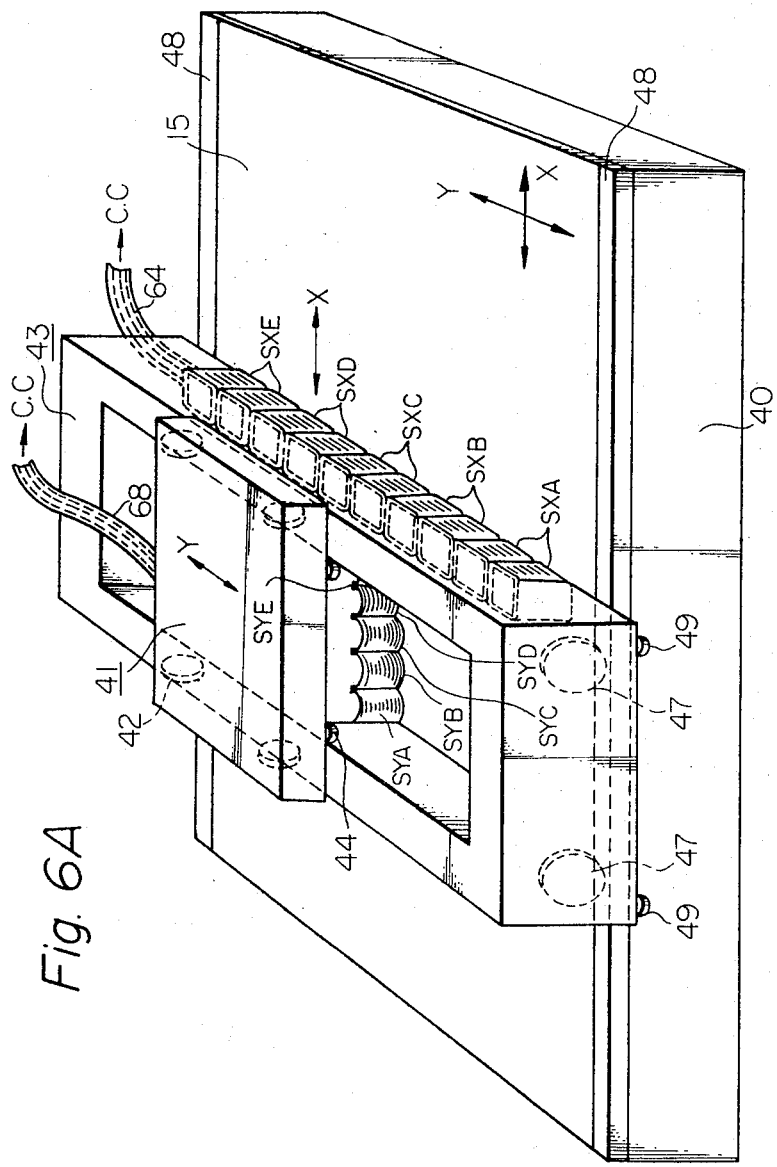

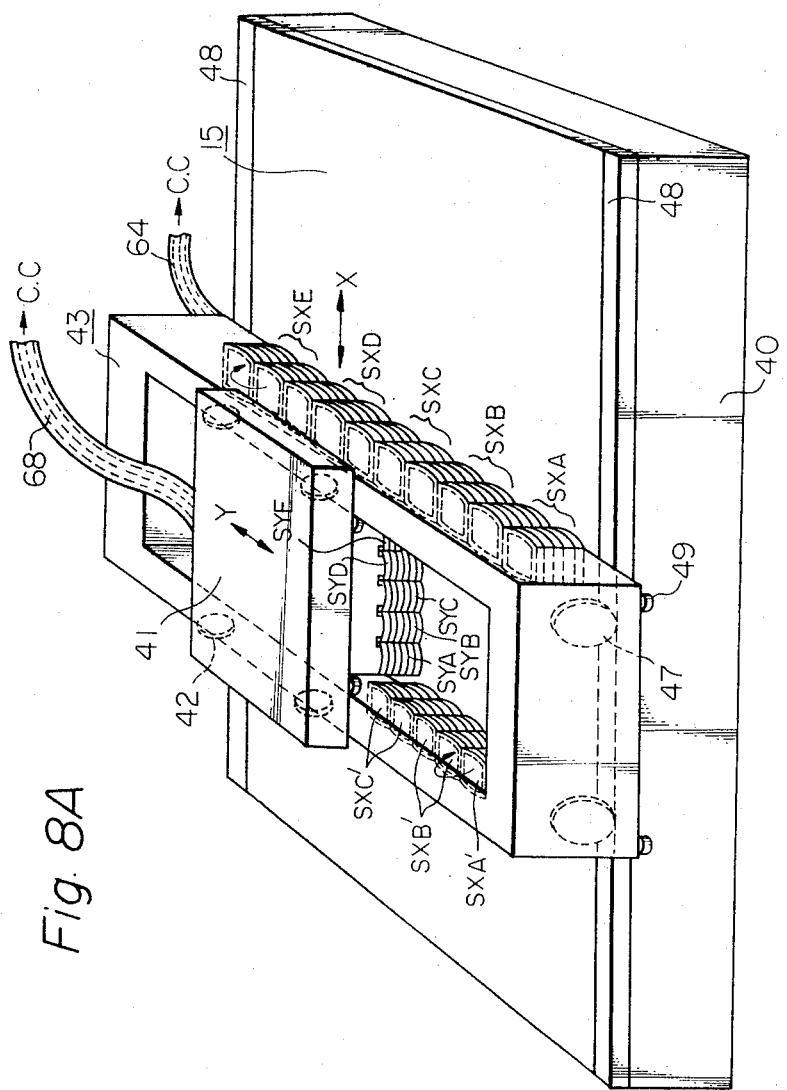

PULSE OPERATED SURFACE MOTOR

The present invention relates generally to a pulse operated electromagnetic drive system in which a movable element moves in a plane slightly above and parallel to a surface of a cooperating plate-like stationary element, and the movement of the movable element is electromagnetically controlled in response to pulse inputs applied from control circuits. The present invention specifically refers to such a drive system as a pulse operated surface motor, and also refers to the movable and the cooperating plate-like stationary elements which are a slider and a scale, that is a stator, respectively. Said movable element, that is the slider, can move in any direction on the plane above the surface of said scale by means of fine steps in either a first or a second direction or in both said directions simultaneously, according to the pulses from the control circuit. Said pulse operated surface motor is comprised of a first slider made of magnetic material surrounded by a first exciting coil which moves in the first direction, a second slider made of magnetic material surrounded by a second exciting coil which moves in the second direction, each slider and coil combination works as one body, and a scale made of magnetic material which cooperates electromagnetically with both first and second sliders. Further said pulse operated surface motor includes means to provide spacing of the movable elements, that is the first and second sliders, from the surface of the scale, that is the stator, to prevent direct contact between said movable elements and scale, because strong attractive force occurs between them when the first and/or the second exciting coils are energized. Consequently, this means eliminates friction forces due to contact between said movable elements and the scale.

In the prior art, said means which eliminates friction forces between the movable elements and the surface of the scale is usually constructed by following method. A cover or housing is positioned over the sliders and engages the base of the movable element in sealing relation. A flexible conduit including control line for electrical connections to the exciting coils, is terminated on the top of the cover. The flexible conduit also supplies fluid, preferably air, under pressure into the cover. With this arrangement, there is a constant flow of air between the bottom of the movable element and the top of the scale. This air flow provides an air bearing between the two members. The attractive force provided by the magnetic coupling between the members and the repulsion force provided by the air bearing are balanced by appropriate adjustment of the air bearing orifice characteristic and the air supply pressure. Consequently, smooth moving action of the movable element is obtained. This moving action of the movable element is very useful when the pulse operated surface motor is utilized in, for example, an automatic manufacturing system which requires fine machining control without manual operation by setting work on the top surface of the movable element. However, it is difficult for heavy work to be moved in any selected direction smoothly by using such prior art pulse operated surface motor as mentioned above. This difficulty will easily be understood as being due to the fact that, because the repulsion force provided by the air bearing is unable to bear the attractive force and the weight of heavy work together the balanced condition is disrupted. It may appear easy to avoid this disadvantage by replacing the air bearing by ball bearings attached to the bottom of the movable element and rotatable in any direction on the top surface of a smooth thin plate, made of nonmagnetic materials, being located on the scale. However, this method is not practical.

Therefore, it is a principal object of the present invention to provide a movable element of a pulse operated surface motor, which moves smoothly in any direction in response to input pulses from a control circuit regardless of the weight of work which is set on the top surface of the movable element.

The present invention will be more apparent from the ensuing description with reference to the accompanying drawings wherein:

FIGS. 1A, 1B and 1C are enlarged side views showing a principle with respect to a moving action of a typical pulse operated surface motor, and;

FIG. 6A is a perspective view showing a first embodiment of a pulse operated surface motor according to this invention;

FIG. 8A is a perspective view showing a second embodiment of the present invention;

In FIGS. 1A, 1B and 1C, it should be noted that some modifications were effected for simplification of explanation. These modifications will become apparent in the course of the following explanation of this specification. It should also be noted that the explanation of the principle of the present invention is effected only with respect to the first sliders fixed to the movable element, because the principle with respect to the second sliders fixed to the same movable element is similar to those shown in FIGS. 1A, 1B and 1C.

Figure 1D:
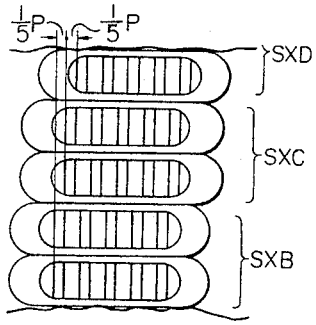
FIG. 1D is a partially enlarged plane view from the bottom of a model of a slider.
Figure 2:
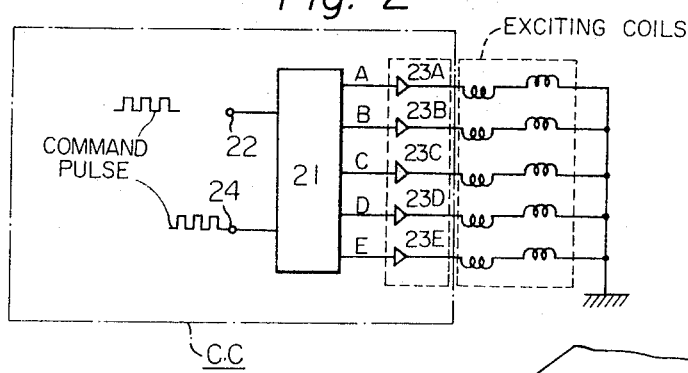
FIG. 2 is a block diagram of a control circuit.

In FIGS. 1A, 1B and 1C, 10 designates the movable element to which X-sliders SXA, SXB, SXC, SXD and SXE, made of magnetic materials, are attached, and at the top left of FIG. 1A, X indicates a direction in which the slider moves along the X-axis. The X-axis corresponds to the first direction mentioned previously. Accordingly the slider which moves in a direction along the Y-axis, perpendicular to the X-axis, will be expressed by the Y-slider comprising Y-sliders SYA, SYB, SYC, SYD and SYE. Each X-slider is comprised of a pole piece 11 to which a plurality of slider teeth 12 are attached and exciting coils 13 which surround the pole piece 11. Each terminal 14 of exciting coils 13 is connected to the control circuit CC (FIG. 2). The control circuit decides a sequence by which each exciting coil is energized. The reference numeral 15 designates the stator to which numeral teeth 16 are attached and these teeth 16 form said scale. These teeth 16 are arranged in a direction along the X-axis at a predetermined pitch "P." It should be understood that other teeth 16 (not shown) are arranged in a direction along the Y-axis at a predetermined pitch "P," preferably P = P' which equals nearly 1 mm, and cooperate electromagnetically with the Y-slider. As a result the Y-slider can move along the Y-axis direction. The slider teeth 12 are also arranged at the predetermined pitch "P."

The pitch with which the X-sliders are arranged is selected to be 1/5P when there are five X-sliders SXA, SXB, ..., SXE. If the movable element 10 is driven along the X-axis direction by three X-sliders SXA, SXB and SXC, said pitch should be selected equal to ⅓P. The pitch with which the X-sliders are arranged will be more clear by referring to FIG. 1D. FIG. 1D is a partially enlarged plane view from the bottom showing the actual configuration of X-sliders.

Moving action is explained as follows. When amplified command pulses from the output of the control circuit C.C, shown in FIG. 2, are applied to the X-exciting coils attached to the X-slider SXA, an attractive force occurs between the pair of slider teeth of the X-slider SXA and a pair of adjacent scale teeth. This attractive force is depicted by imaginary parallel lines 17 in FIG. 1A. The X-slider SXA, and accordingly the movable element 10, moves to a position where the center portion of slider teeth coincides with the center portion of the adjacent scale teeth 16. Next, two separate amplified command pulses from the output of the control circuit C.C are applied to the X-exciting coils attached to the X-slider SXA and to the X-exciting coils attached to the X-slider SXB. Two attractive forces occur which are depicted by the two groups of parallel lines shown in FIG. 1B. The X-sliders SXA and SXB, and accordingly the movable element 10, move to a position where a middle point between the center portions of the slider teeth attached to SXA and SXB coincides with a middle point between the center portions of the two adjacent scale teeth 16. At this time one step movement of the movable element 10 along the X-axis direction is obtained and the length of the one step corresponds to 1/10P. In FIG. 1C, if the P is selected to be 1 (mm), one step becomes 0.1 (mm). Next only the exciting coil attached to the X-slider SXB is energized and the X-slider SXB moves to a portion where the center portion of the slider teeth of SXB coincides with the center portion of the adjacent scale teeth 16.

At this time, one step movement, that is 1/10P, of the movable element 10 is obtained in the same manner as the explanation mentioned above with regard to FIG. 1A. Consequently, when the exciting coils attached to the X-sliders SXA, SXB, ..., SXE are energized in this order: (SXA), (SXA, SXB), (SXB), (SXB, SXC), (SXC), (SXC, SXD), (SXD), (SXD, SXE), (SXE) and (SXE, SXA) the movable element 10 steps every 1/10P upon respective energization along the X-axis direction.

It should be noted that the movable element 10 also steps every 1/10P upon respective energization along the Y-axis direction when the Y-sliders are energized in this order: (SYA), (SYA, SYB), (SYB), (SYB, SYC), (SYC), (SYC, SYD), (SYD), (SYD, SYE), (SYE) and (SYE, SYA).

The sequence for energizing the exciting coils is not limited to the above-mentioned sequence and orders such as (SXA, SXB), (SXA, SXB, SXC), (SXB, SXC), (SXB, SXC, SXD), (SXC, SXD), (SXC, SXD, SXE), (SXD, SXE), (SXD, SXE, SXA), (SXE, SXA) and (SXE, SXA, SXB) are more preferable in view of increased driving force and reduced vibration in actual operation. These sequences are provided by control circuit CC shown in FIG. 2.

FIG. 2 is a block diagram of the control circuit CC. The X-slider is driven by one control circuit CC and the Y-slider is driven by another control circuit CC. Both control circuits have the same block diagram shown in FIG. 2. Operation of the control circuit is as follows.

Command pulses are applied to exciting controller 21 through the forward input terminal 22. The exciting controller 21 decides energization orders of the exciting coils of the slider and the outputs from the exciting controller 21 excite the selected exciting coils through amplifiers 23A, 23B, ..., 23E in accordance with said energization orders. In FIG. 2, each set of two reactance elements connected in series indicates a pair of exciting coils attached to each slider.

Figure 7A:
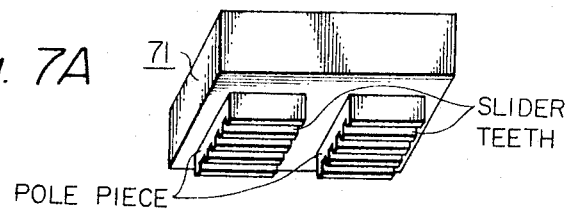
FIG. 7A shows detailed construction of a disassembled slider of the present invention.
Figure 7B:
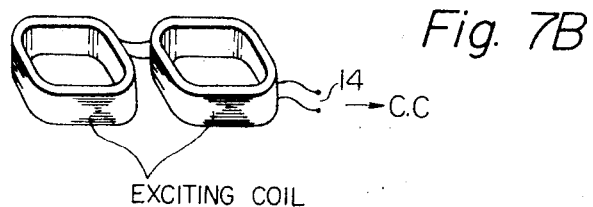
FIG. 7B shows a pair of exciting coils separated from the slider of the present invention.

The actual construction of the pair of exciting coils is shown in FIG. 7B. When reversed energization orders are required, the command pulses are applied to the reverse input terminal 24.

Figure 3A:
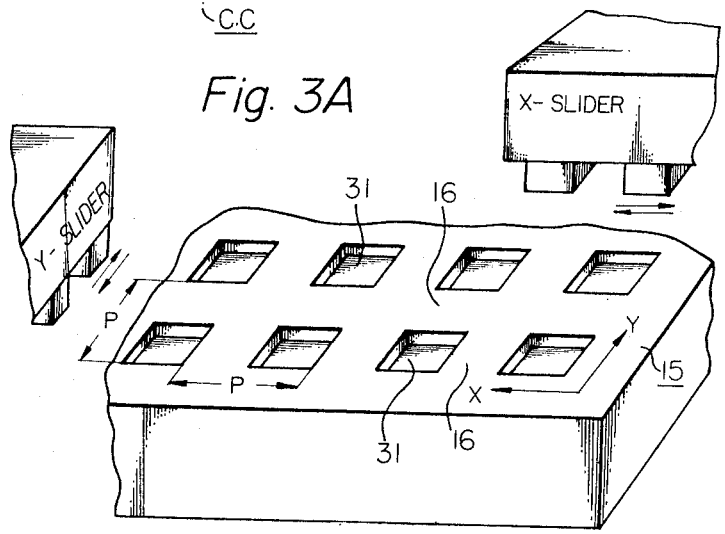
FIGS. 3A, 3B and 3C are enlarged perspective views of a stator.

FIG. 3A is a first example showing an enlarged perspective view of the stator 15 being provided with the scale teeth 16, made of magnetic materials, wherein numerous cavities 31 are formed and, as a result, the remaining portions form the scale teeth like a grid along the X- and Y-axes. The cavities 31 are filled by non-magnetic material. However, it is not actually necessary to fill the cavities with materials such as glass, resin, aluminum or brass because the air is also a non-magnetic material.

Figure 3B:
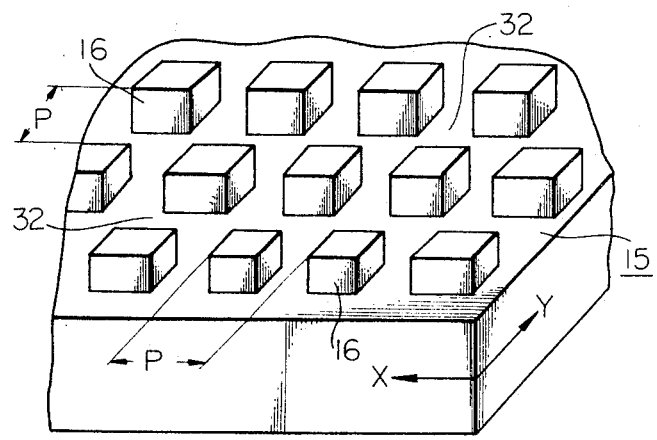

FIG. 3B is a second example showing an enlarged perspective view of the stator 15 being provided with the scale teeth 16 wherein grooves 32 are formed like a grid and, as a result, the remaining projected portions form the scale teeth along the X- and Y-axes.

Figure 3C:
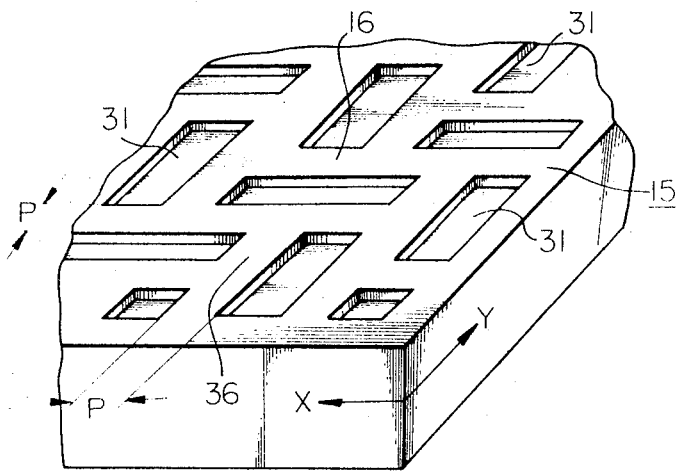

FIG. 3C is a third example showing an enlarged perspective view of the stator 15 being provided with the scale teeth 16 wherein two kinds of rectangular cavities are formed, the length of one type being parallel to the X-axis and the length of the other type being parallel to the Y-axis.

Figure 4:
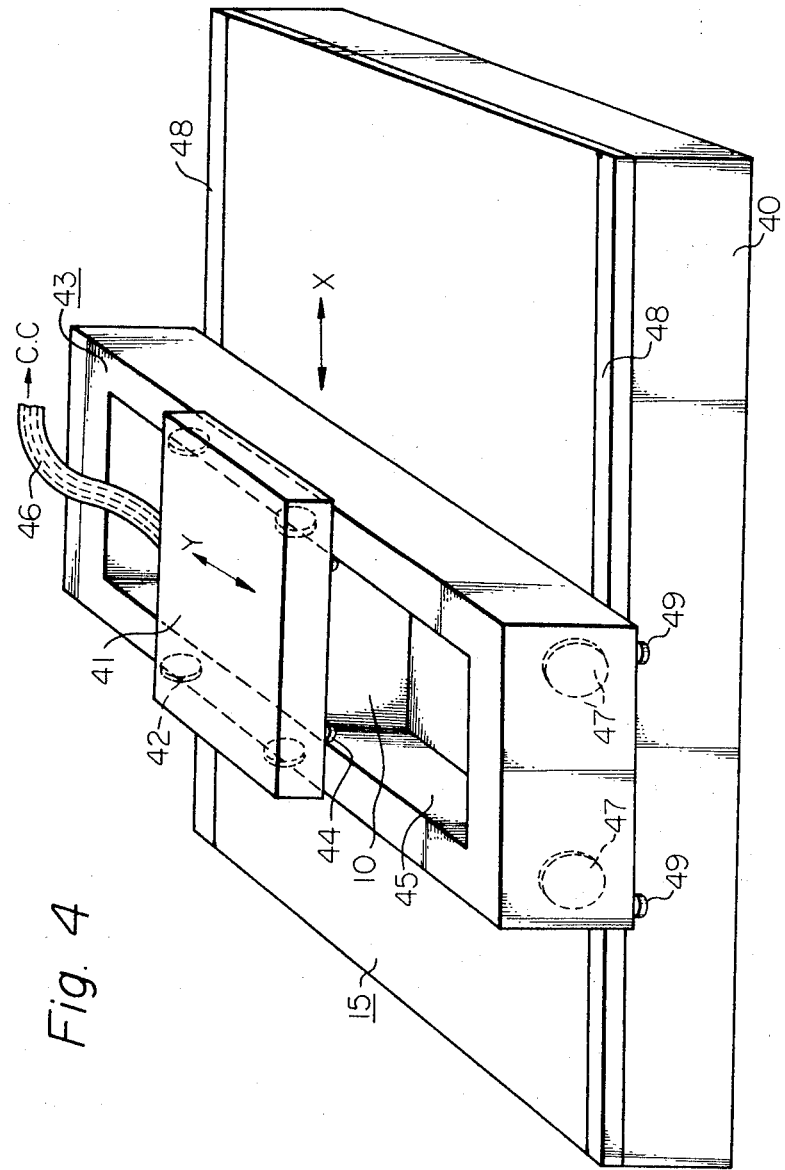
FIG. 4 is a perspective view showing an explanatory illustration of a pulse operated surface motor according to this invention.

FIG. 4 is a perspective view showing an explanatory illustration of a pulse operated surface motor according to this invention. In FIG. 4, 40 designates a base of a pulse operated surface motor and stator 15 is located on the surface of the base 40. The stator 15 is provided with scale teeth 16 (not shown) in a manner such as is shown in FIG. 3A, 3B or 3C. The scale teeth 16 cooperate electro-magnetically with the X- and Y-slider teeth 12 (not shown in FIG. 4), and these X- and Y-slider teeth 12 are arranged on the bottom of the movable element 10. The movable element 10 is mounted to the bottom of a mounting plate 41. The mounting plate 41 is provided with rollers 42 rotatable on the top surface of the support frame 43, keeping a small vertical gap between the X- and Y-slider teeth located on the movable element 10 and the scale teeth 16 mounted on stator 15. The mounting plate 41 is further provided with guide rollers 44, at its four corners rotatable on the side surfaces 45 of the support frame 43 so that the mounting plate may displace to any selected position along the Y-axis direction when the Y-sliders are energized by the amplified command pulses from control circuit CC through a feed line 46, and thereby the mounting plate 41 is accurately, smoothly and selectively positioned along the Y-axis direction. The support frame 43 is also provided with rollers 47 rotatable on rail faces 48 and the bottom surface of the support frame 43 maintains a small vertical gap with the surface of the stator 15 during movement. The support frame 43 is further provided guide rollers 49, at its four corners, rotatable on the side surfaces of the base 40 so that the mounting plate may displace to any selected position by pushing the side surfaces 45 of support frame 43 along the X-axis direction when the X-sliders are energized by amplified command pulses from control circuit CC through the feed line 46, and thereby the mounting plate 41 is accurately, smoothly and selectively positioned along the X-axis direction. Thus, the mounting plate 41 is capable of being displacing to any selected position on the surface of the stator 15 by the X- and Y-sliders upon their being energized by the command pulses through the feed line 46.

It is easily recognized that a piece of work fixed on the surface of the mounting plate 41 can move with high accuracy and smooth moving action to any selected portion along the surface of the stator 15. It should be noticed that this high accuracy and smooth moving action are obtained regardless of the weight of the piece of work fixed on the mounting plate 41. When it is necessary to deal with heavy pieces of work it is desirable to construct the mounting plate 41, the support frame 43 and rollers 42, 47 out of durable material such as aluminum brass or other materials similar thereto. It is also necessary to design the construction of mounting plate and the support frame so that they are mechanically strong.

Figure 5:
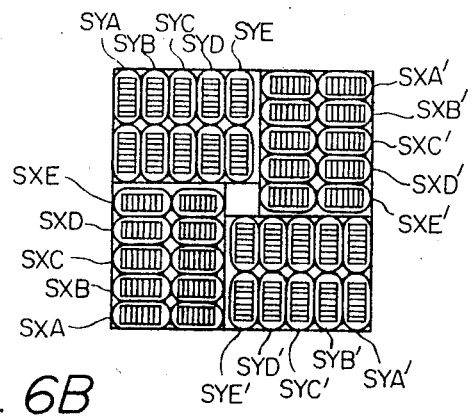
FIG. 5 is a bottom view of the movable element of the prior art.

FIG. 5 is one example of a bottom view of the movable element 10 of the present invention in which the arrangement of the X- and Y-sliders is the same as in the prior art. That is, as in the prior art, the X-sliders, SXA and SXA' (also SXB and SXB', . . . SXE and SXE') and the Y-sliders SYA and SYA' (also SYB and SYB', . . . SYE and SYE') are respectively energized at the same time according to the command pulses through the feed line 46.

However, unlike the prior art, in the present invention, the movable element 10 is fixed to the mounting plate 41 which moves along the top surface of the support frame 43 on the rollers 42, and; the support frame 43 moves along the surface of the stator 15 on the roller 47. As a result of this arrangement of the present invention, a pulse operated surface motor which is able to deal with heavy work can be obtained.

The explanatory illustration of pulse operated surface motor according to the present invention shown in FIG. 4 is illustrated only to explain the principal of operation, but it is not usable in practice because it has the following disadvantages.

When the X-sliders and Y-sliders are energized at the same time, and in addition a heavy work piece is located on the surface of mounting plate 41, the attractive forces acting on the X- and Y-sliders and the weight of the heavy work piece exert a maximum downward force on the mounting plate 41. This maximum downward force being exerted on the mounting plate 41 is also applied on the support frame 43 through rollers 42 and, as a result, deflection occurs on both sides of the support frame 43. Consequently, it is difficult for the movable element 10 to keep the small vertical gap constant between the bottom of the movable element 10 and the top surface of the scale during movement. This means that a constant and powerful driving force of the movable element 10 along the sides cannot be obtained. The deflection also has deletrious effect upon fine movement of the mounting plate 41 when high accuracy of the movement is required.

Figure 6B:
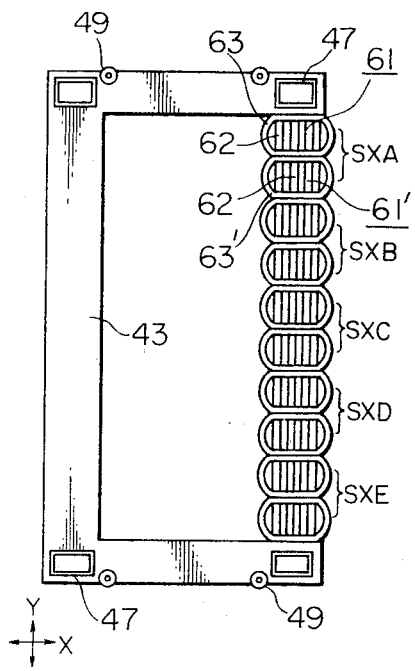
FIG. 6B is a bottom view of the support frame according to the first embodiment of present invention.

FIG. 6A is a perspective view showing a first embodiment of a pulse operated surface motor according to this invention. The first embodiment can overcome said deleterious effect caused by said deflection occurring on both sides of the support frame 43. In the first embodiment, the X-sliders SXA, SXB, SXC, SXD and SXE are separated from the movable element and spread out along the sides of the frame 43. This arrangement is clear from FIG. 6A. FIG. 6B is a bottom view of the support frame 43 according to FIG. 6A. In FIG. 6B the support frame 43 holds five pairs of X-sliders SXA, SXB, . . . , SXE. Each X-slider has one pair of X-slider pole pieces 61 and 61', and the X-slider teeth 62 are attached to the X-slider pole pieces so as to cooperate electromagnetically with said scale teeth. Each X-slider pole piece is usually provided with two or more X-slider teeth 62, and each pair of X-slider pole pieces is surrounded by one pair of X-exciting coils 63 and 63'. When a voltage is applied to the terminals of the X-exciting coils, a magnetic path is obtained through the X-slider pole pieces, X-slider teeth, air gaps and adjacent scale teeth. As a result, an attractive force occurs between the X-slider teeth and the adjacent scale teeth. This attractive force allows the support frame 43 to be placed in a selected position along the X-axis direction by controlling pulses applied to the X-exciting coils from the control circuit CC through a feed line 64 (FIG. 6A).

Figure 6C:
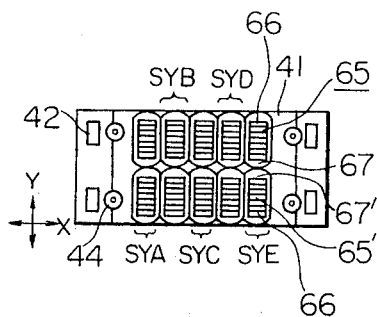
FIG. 6C is a bottom view of the mounting plate according to the first embodiment of the present invention.

FIG. 6C is also a bottom view of the mounting plate 41 according to FIG. 6A. In FIG. 6C, the mounting plate 41 holds five pairs of Y-sliders SYA, SYB, . . . , SYE. Each Y-slider has one pair of Y-slider pole pieces 65 and 65', and the Y-slider teeth 66 are attached to the Y-slider pole pieces so as to cooperate electromagnetically with said scale. Each Y-slider pole piece is usually provided with two or more Y-slider teeth 66, and each pair of Y-slider pole pieces is surrounded by one pair of Y-exciting coils 67 and 67'. When a voltage is applied to the terminals of the Y-exciting coils, a magnetic path is obtained through the Y-slider pole pieces, Y-slider teeth, air gaps and adjacent scale teeth. As a result, an attractive force occurs between the Y- slider teeth and the adjacent scale teeth. This attractive force allows the mounting plate 41 to be placed in a selected position along the Y-axis direction by controlling pulses applied to the Y-exciting coils from the control circuit CC through a feed line 68 (FIG. 6A). Thus, said attractive forces obtained by the X- and Y-sliders allow the mounting plate 41 to be placed with high accuracy at any selected portion on the surface of the stator 15.

FIG. 7A shows detailed construction of a disassembled X- or Y-slider 71 wherein each pole piece has five slider teeth.

FIG. 7B shows a pair of X- or Y-exciting coils disassembled from an X- or Y-slider. The terminals 14 of the exciting coils are connected to the control circuit CC through feed line 64 or 68 shown in FIG. 6A.

Figure 8B:
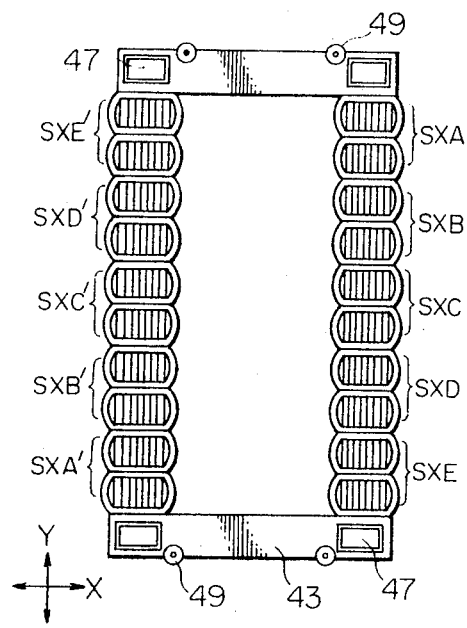
FIG. 8B is a bottom view of the support frame according to the second embodiment of the present invention.

FIG. 8A is a perspective view showing a second embodiment of the present invention. In FIG. 8A, the support frame 43 is further provided with another five pair of X-sliders SXA', SXB', SXC', SXD' and SXE' along another side of support frame 43. The X-sliders SXA and SXA' (also SXB and SXB', ..., SXE and SXE') are energized at the same time by the control pulses through the feed line 64. The bottom view of the support frame 43 according to the second embodiment is shown in FIG. 8B. The bottom view of the mounting plate 41 which is provided with Y-sliders, is same as FIG. 6C. It is obvious that the driving force, especially along the X-axis direction applied to the mounting plate 41 of the second embodiment is nearly two times that of the first embodiment.

Figure 9A:
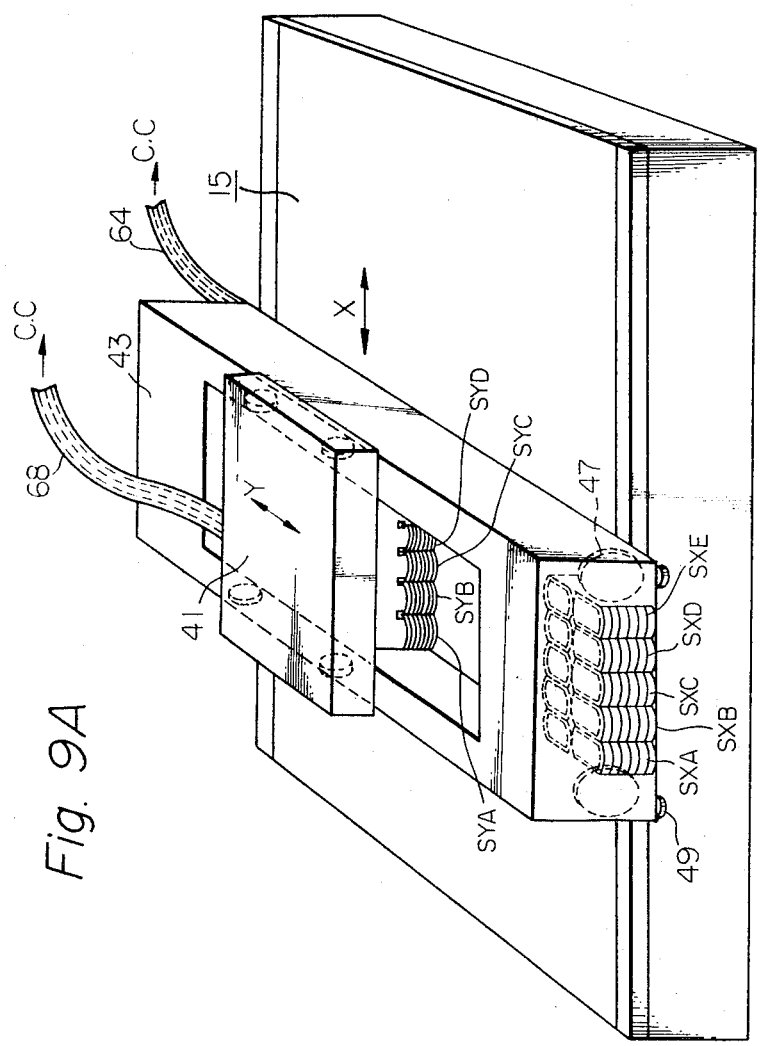
FIG. 9A is a perspective view showing a third embodiment of the present invention.
Figure 9B:
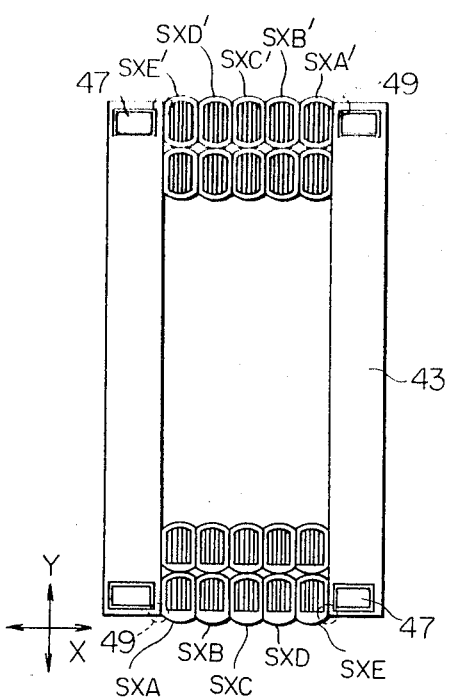
FIG. 9B is a bottom view of the support frame according to the third embodiment of the present invention.
Figure 10:
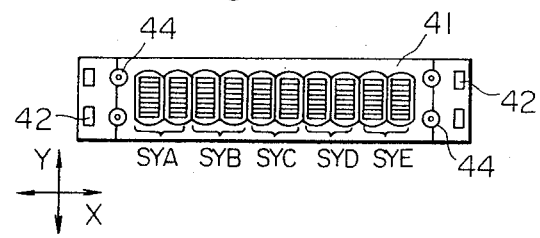
FIG. 10 is another embodiment of the present invention showing a bottom view of the mounting plate.

FIG. 9A is a perspective view showing a third embodiment of the present invention. In FIG. 9A the X-sliders SXA, SXB, ..., SXE are arranged on one side of support frame 43 parallel to the X-axis, if necessary, the other X-sliders SXA', SXB', ..., SXE' are arranged on the other side of the support frame 43 parallel to the X-axis. The X-sliders SXA and SXA' (also SXB, SXB', ..., SXE and SXE') are energized at the same time. In the case where there are two groups of X-, Y-sliders, that is for example SXA and SXA', ..., SXE and SXE'; it should be noted that each arrangement of SXA and SXA' (also SXB and SXB', ..., SXE and SXE') has the same phase with respect to the arrangement of the scale teeth. FIG. 9B is a bottom view of support frame 43 according to the third embodiment which has two groups of X-sliders on its sides along the X-axis direction. The bottom view of the mounting plate 41, provided with Y-sliders can be same as FIG. 6C. However, the arrangement of Y-sliders shown in FIG. 10 which is also a bottom view of a support frame 43, is more preferable. As will be easily recognized the arrangement of Y-sliders shown in FIG. 10 allows a moving stroke of the mounting plate 41 along the Y-axis direction to be increased over that of the mounting plates constructed as shown in FIG. 5 and FIG. 6C, because the width of the Y-sliders along Y-axis direction is shortened. Naturally, the arrangement of the Y-slider shown in FIG. 10 may also be applied to the first and second embodiments.

The third embodiment has the following advantage compared to the first and second embodiments. The deflection occurring on both sides along the Y-axis direction of the support frame 43 is caused by only the downward force which is applied to the mounting plate 41, and as a result the amount of said deflection with the third embodiment becomes minimal. This means that the Y-slider teeth can cooperate electromagnetically with the scale teeth keeping a constant small vertical air gap along the Y-axis direction on the surface of the stator 15 and, as a result a powerful and uniform driving force is exerted on the mounting plate 41.

Figure 11A:
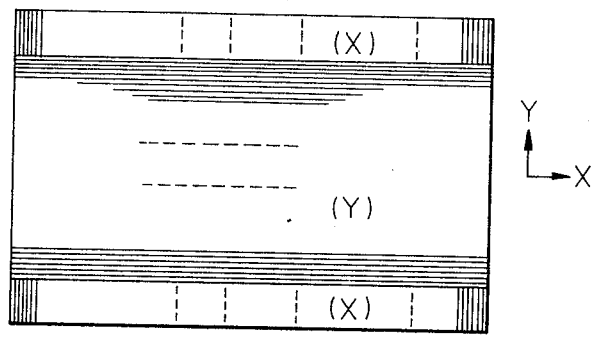
FIG. 11A is another embodiment of the present invention showing a plane view of the stator.
Figure 11B:
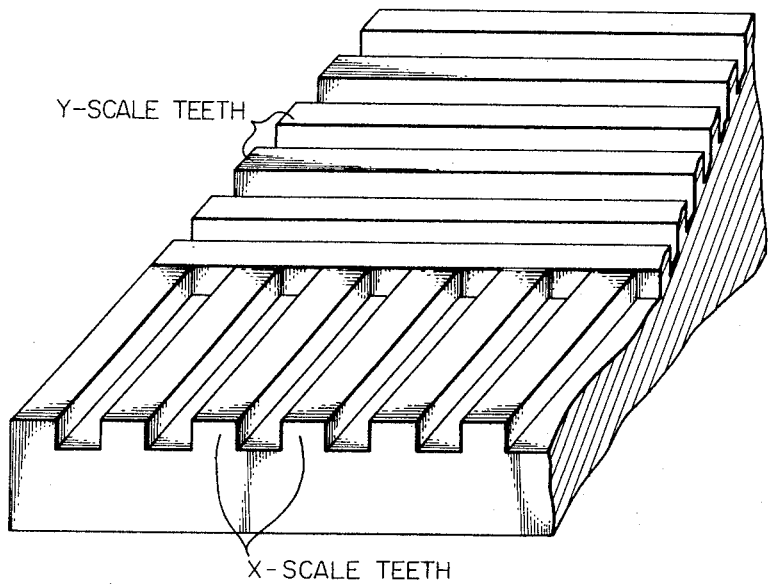
FIG. 11B is a perspective view of the stator shown in FIG. 11A.

The X- and Y-sliders according to explanatory illustration and the first through the third embodiments can cooperate electromagnetically with any type of scale teeth arrangement such as for example, those shown in FIGS. 3A, 3B and 3C. However, each arrangement of the scale teeth shown in FIGS. 3A, 3B and 3C has the following essential and common disadvantage. That is, because both the scale teeth cooperating with X-sliders and the scale teeth cooperating with Y-sliders are provided on same surface of the stator 15, the effective areas of each group of scale teeth are small compared to the whole surface of the stator 15. Consequently, when any of the scale teeth arrangements shown in FIGS. 3A, 3B and 3C, are used, the driving force of the mounting plate 41 is smaller than that of the value calculated by theory. This disadvantage can be removed by using the arrangement of X- and Y-sliders according to the third embodiment, and by adopting the arrangement of scale teeth shown in FIG. 11A. It is obvious in FIG. 11A that the effective areas of the two groups of scale teeth are maximum because the two groups are separated from each other and effective area is not lost in the separation of individual teeth on the same surface cooperating with different sliders. Therefore, the arrangement shown in FIG. 11A provides maximum and uniform driving force and highly accurate moving action. FIG. 11B is a perspective view of the scale teeth according to FIG. 11A.

From the above explanation it will be understood that according to this invention, a pulse operated surface motor having advantages compared to the prior art as shown below is realized.

1. A heavy work piece can be dealt with effectively.

2. The moving stroke along the Y-axis direction of the mounting plate is increased.

3. The number of X- or Y-slider can easily be increased, and thereby the driving force can easily be increased.

4. Scale teeth arranged in a manner such as is shown in FIGS. 11A and 11B can be utilized wherein maximum effective areas cooperating electromagnetically with each X- and Y-slider teeth are obtained and, accordingly, maximum driving force can be applied to the mounting plate.

What is claimed is:

1. A pulse operated surface motor comprising:
a stator having magnetic materials and non-magnetic materials arranged at predetermined intervals both in first and second directions perpendicular to each other on a surface of the stator, the magnetic materials forming stator teeth acting as pole pieces;
a first movable body being restrained to move only in said first direction;
a second movable body located on the first movable body, which is restrained to individually move only in said second direction but which moves together with said first movable body in said first direction, wherein the second movable body is provided with both a first slider cooperating electromagnetically with said stator teeth arranged at said predetermined intervals in said first direction and a second slider cooperating electromagnetically with said stator teeth arranged at said predetermined intervals in said second direction.

2. A pulse operated surface motor comprising:

a stator having magnetic materials and non-magnetic materials arranged at predetermined intervals both in first and second directions perpendicular to each other on a surface of the stator, the magnetic materials forming stator teeth acting as pole pieces;

a first movable body being restrained to move only in said first direction;

a second movable body located on the first movable body, which is restrained to individually move only in said second direction but which moves together with said first movable body in said first direction, wherein the first movable body is provided with a first slider cooperating electromagnetically with said stator teeth arranged at said predetermined intervals in said first direction and said second movable body is provided with a second slider cooperating electromagnetically with said stator teeth arranged at said predetermined intervals in said second direction.

3. A pulse operated surface motor comprising:

a stator, a surface of which is provided with a first area and a second area separated from each other said first are having magnetic materials forming first stator teeth and non-magnetic materials arranged at predetermined intervals in a first direction and said second area having magnetic materials forming second stator teeth in a second direction perpendicular to said first direction;

a first movable body being restrained to move only in said first direction and which is provided with a first slider which cooperates electromagnetically with said first stator teeth;

a second movable body located on the first movable body, which is restrained to individually move only in said second direction but which moves together with said first movable body in said first direction, and which is provided with second slider teeth cooperating electromagnetically with said second stator teeth.

* * * * *